Patented July 12, 1927.

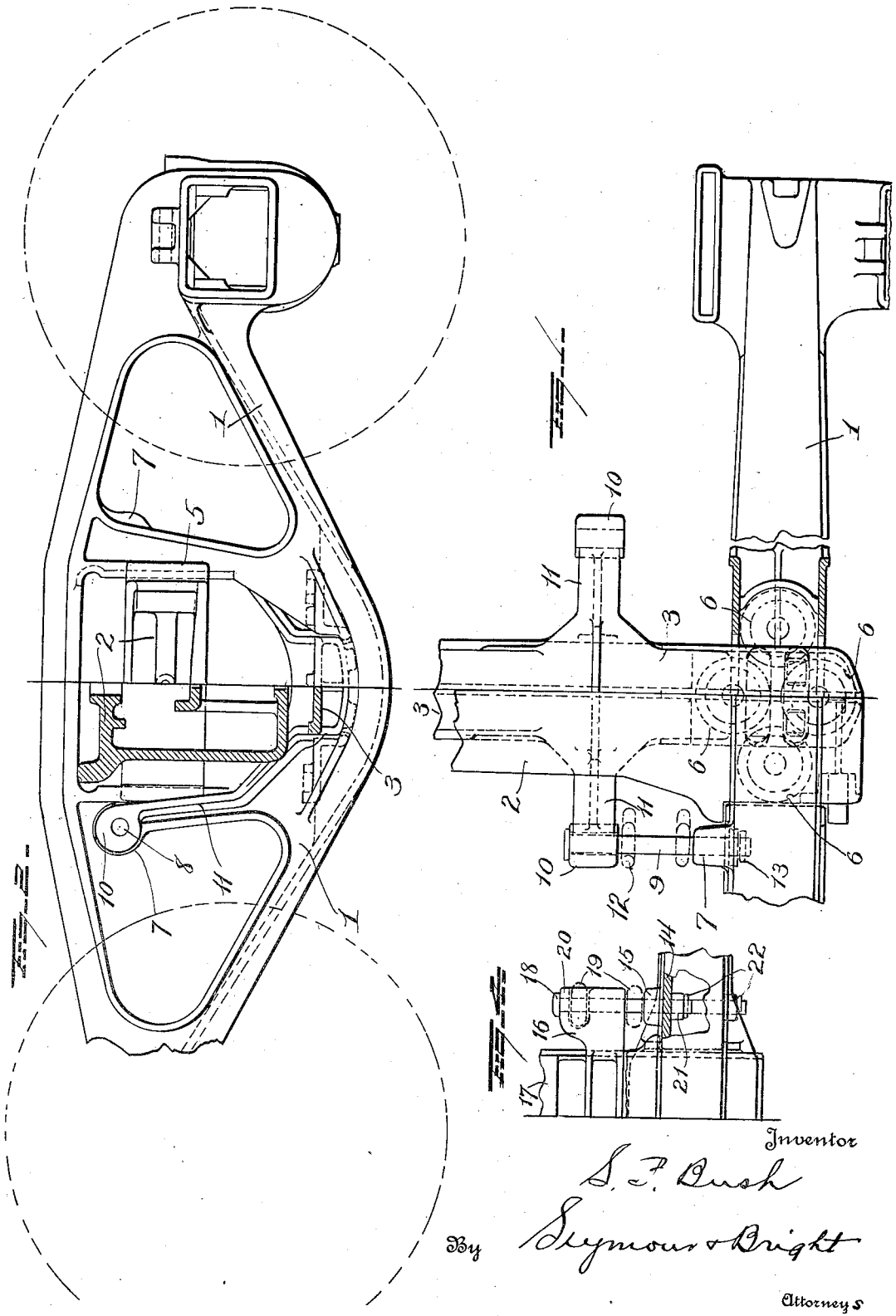

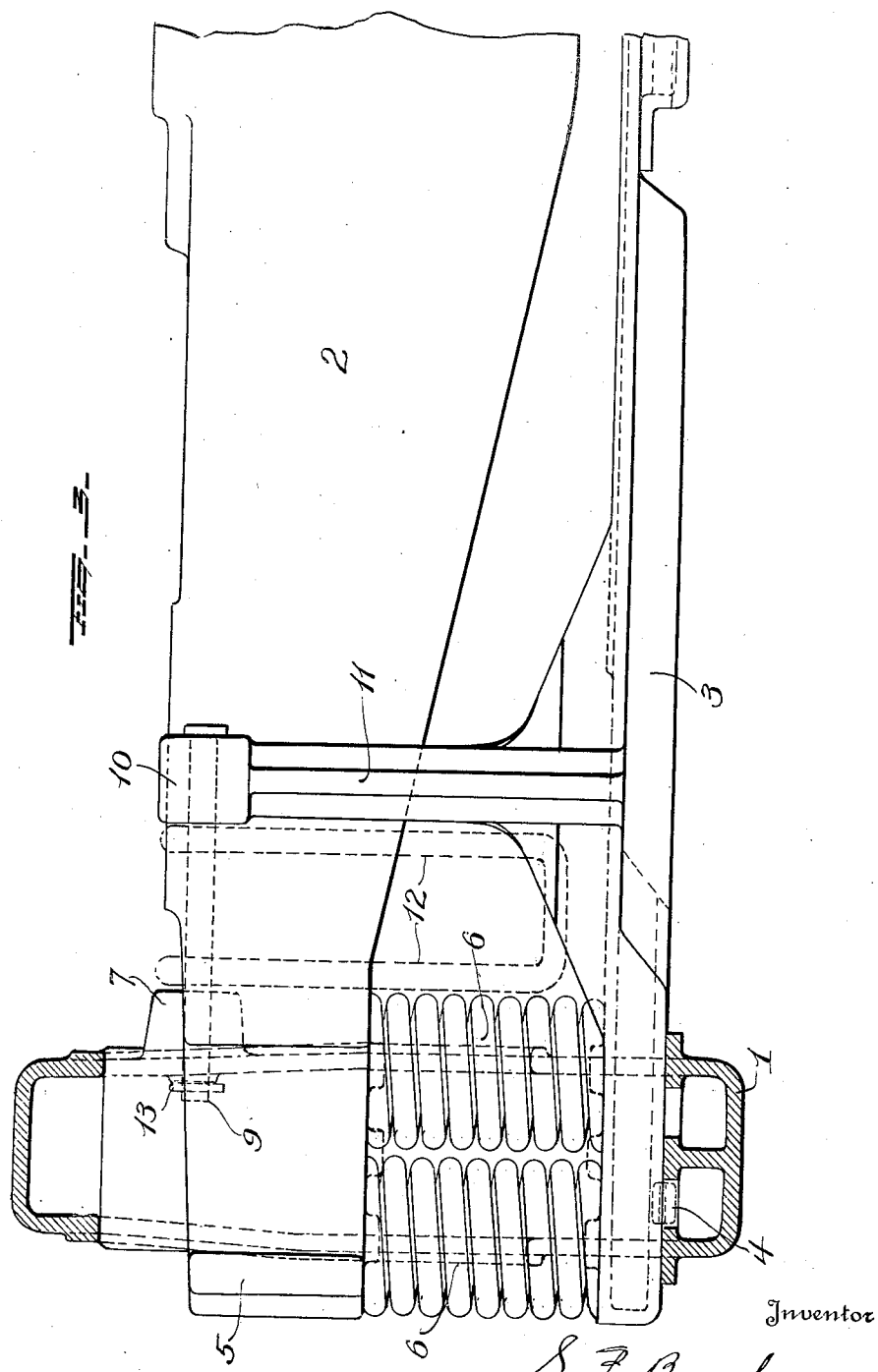

1,635,740

UNITED STATES PATENT OFFICE.

SAMUEL P. BUSH, OF COLUMBUS, OHIO, ASSIGNOR TO THE BUCKEYE STEEL CASTINGS COMPANY, OF COLUMBUS, OHIO.

CAR TRUCK.

Application filed July 20, 1926. Serial No. 123,720.

This invention relates to car trucks and has special reference to the means for supporting the brake gear, the object being to support the brake hanger upon the spring plank and the side frame in such a manner that the side frame may be removed without materially disturbing the brake gear, the springs, the bolster, and the spring plank. The invention is illustrated in the accompanying drawing and will be hereinafter fully described, the novel features being particularly defined in the appended claims.

In the drawing, Figure 1 is a view partly in top plan and partly in horizontal section beneath the bolster.

Figure 2 is a view partly in side elevation and partly in section,

Figure 3 is a view showing a portion of the bolster and the spring plank in elevation and the side frame in transverse vertical section, Figure 4 is a detail plan view showing a form differing somewhat in detail from that shown in Fig. 1 and applicable to an ordinary type of four-wheel truck.

The reference numeral 1 designates the side frame which is cast as a single integral structure, 2 the bolster, and 3 the spring plank, the ends of the bolster and the spring plank being inserted through the opening between the columns of the side frame. The spring plank is held against accidental release from the side frame by interengaging studs and sockets, as indicated at 4, and the outside bolster stops 5 are removable, or may be omitted entirely if preferred, the bolster being supported by springs 6 supported by the lower member of the side frame.

Upon the inner wall of the side frame, adjacent the top of the column, is a boss 7 around an opening 8 adapted to receive and support the outer end of a suspension pin or bolt 9, the inner headed end of the pin or bolt being engaged through and held by an eye 10 at the upper end of a bracket 11 rising from the spring plank. The bracket 11 is preferably cast integral with the spring plank but it may be formed separately and bolted or riveted in place. A brake hanger 12 in the form of a bail or U-shaped loop is hung on the pin 9 between the boss 7 and the bracket 11, and said pin is held against accidental release by any convenient form of stop, such as the cotter pin 13 inserted through its end and adapted to bear against the outer face of the inner side wall of the side frame, the outside bolster stops 5 being unnecessary.

When wheel renewals or adjustments are necessary, the spring plank is jacked up sufficiently for the studs thereon to clear the tension member of the side frame, the cotter pin 13 is removed, and the bolster stops 5, if present, are also removed. The side frame may then be withdrawn laterally, leaving the bolster, spring plank, springs, and brake gear intact. The outer end of the pin 9 will, of course, be unsupported but the bracket 11 will serve in an adequate manner to hold the pin and the brake hanger against dropping. Moreover, inasmuch as the suspension pin is secured in the side frame, the brake hanger and beam will be prevented from dropping in the event of accidental breakage of the spring plank or the brake hanger bracket.

In Fig. 4, the side frame 14 is provided with a boss 15 corresponding to the boss 7 in the first-described form. A bracket 16 rises from the spring plank 17 to carry the suspension bolt or pin 18 which passes through the boss 15 just as the pin or bolt 9 passes through the boss 7. The upper end of the bracket 16 fits between the eyes 19 of the brake hanger and is provided on its inner edge with an offset 20 having an opening therethrough to receive the suspension pin or bolt. The offset 20 fits between the head of the suspension pin or bolt and the inner eye 19 while the outer eye 19 is held between the outer edge of the bracket and the boss 15. Instead of the cotter pin 13, a nut 21 is shown locked to the suspension bolt by a cotter pin 22 to hold the side frame in place, and the suspension pin or bolt, obviously, may be long enough to extend entirely across the side frame so that the nut 21 will bear against the outer side thereof. With this form, I obtain a quadruple shear for the suspension pin, and an extended firm support for the brake hanger when the side frame is removed.

Having fully described my invention what I claim as new and desire to secure by Letters-Patent, is:—

1. In a car truck side frame comprising an upper and lower member, columns connecting them, a spring and bolster opening between the columns, a spring plank supported by the lower member, and means for supporting the brake gear partially by the spring plank and partially by the side frame direct.

2. In a car truck a side frame comprising an upper and lower member, columns connecting them, a spring and bolster opening between the columns, a spring plank supported by the lower member and having a bracket attached thereto, and means for supporting the brake gear partially through said bracket on the spring plank and partially upon the frame direct.

3. In a car truck a side frame comprising an upper and lower member, columns connecting them, a spring and bolster opening between the columns, a spring plank supported by the lower member and having a bracket attached thereto, and means for supporting the brake gear partially upon the spring plank and partially upon the side frame direct whereby the truck frame can be removed and the brake gear remain supported by the bracket.

4. In a car truck, the combination of a side frame, a spring plank engaged in the side frame, a bracket rising from the spring plank, a suspension pin engaged through the upper end of the bracket and in the side frame, removable means for normally holding the pin against release, and a brake hanger suspended on said pin and held against lateral movement by the side frame and the bracket.

5. In a car truck, the combination of a side frame, a spring plank engaged in the side frame, a bracket rising from the spring plank, a suspension pin engaged through the upper end of the bracket and in the side frame, a brake hanger suspended on said pin, and means cooperating with the outer end of the pin and the side frame to prevent separation of the side frame and the pin.

6. In a car truck, the combination of a side frame having a bolster opening, a bolster provided with stops against the inner side of the frame, a spring plank engaged in the bolster opening and interlocking with the side frames, brake hanger brackets rising from the spring plank, brake hanger suspension pins engaged through the upper ends of the brackets and the side frames, and means at each end of the suspension pins whereby opposite side frames are held in normal relation with respect to each other.

In testimony whereof, I have signed this specification.

SAMUEL P. BUSH.